United States Patent
Hessenkämper

(10) Patent No.: US 9,707,655 B2
(45) Date of Patent: Jul. 18, 2017

(54) MACHINE TOOL, WORKPIECE MACHINING METHOD AND USE IN A MACHINE TOOL OR IN A WORKPIECE MACHINING METHOD

(75) Inventor: Axel Hessenkämper, Gütersloh (DE)

(73) Assignee: Sauer Ultrasonic GMBH, Stipshausen (DE)

( * ) Notice: Subject to any disclaimer, the term of this patent is extended or adjusted under 35 U.S.C. 154(b) by 851 days.

(21) Appl. No.: 14/125,397

(22) PCT Filed: Jun. 14, 2012

(86) PCT No.: PCT/EP2012/061345
§ 371 (c)(1),
(2), (4) Date: Apr. 14, 2014

(87) PCT Pub. No.: WO2012/172014
PCT Pub. Date: Dec. 20, 2012

(65) Prior Publication Data
US 2014/0216216 A1     Aug. 7, 2014

(30) Foreign Application Priority Data
Jun. 15, 2011  (DE) .................. 10 2011 077 568

(51) Int. Cl.
*B23B 1/00* (2006.01)
*B23Q 5/54* (2006.01)
(Continued)

(52) U.S. Cl.
CPC .................. *B23Q 5/54* (2013.01); *B23B 1/00* (2013.01); *B23B 29/125* (2013.01); *B23B 37/00* (2013.01);
(Continued)

(58) Field of Classification Search
CPC ............ B23C 2200/48; B23C 2250/04; B23C 2250/16; B23C 2260/76; B23B 1/00; B23B 29/125; B23B 37/00; B23P 25/00
See application file for complete search history.

(56) References Cited

U.S. PATENT DOCUMENTS 3,504,581 A * 4/1970 Grabkowski .......... B23Q 15/12
                                          318/460
3,754,487 A * 8/1973 Nachtigal ................ B23B 1/00
                                          318/561
(Continued)

FOREIGN PATENT DOCUMENTS

DE   10 2007 013055 A1    9/2008
DE   20 2008 017520 U1    10/2009
(Continued)

OTHER PUBLICATIONS

Weck, Manfred, Brecher, Christian, "Werkzeugmaschinen, Messtechnische Untersuchung und Beurteilung, dynamische Stabilitat", Dec. 31, 2006, Springer, Berlin, Heidelberg, vol. 5, pp. 245-254.

(Continued)

*Primary Examiner* — Will Fridie, Jr.
(74) *Attorney, Agent, or Firm* — Ziegler IP Law Group, LLC

(57) ABSTRACT

In a method for machining a workpiece using a tool, the tool engages with the workpiece and between the two a cutting motion is induced. Furthermore, a relative first vibration motion between workpiece and tool, which is superimposed on the cutting motion, is induced in such a way that one or more characteristic values of the first vibration motion and one or more characteristic values of the cutting motion are adjusted in relation to one another. The superimposed vibra- (Continued)

tion motion can also be induced in such a way that distinctive surface zones of the workpiece are generated.

16 Claims, 8 Drawing Sheets

(51) Int. Cl.
   *B23B 29/12* (2006.01)
   *B23B 37/00* (2006.01)
   *B23C 3/00* (2006.01)
   *B23P 25/00* (2006.01)

(52) U.S. Cl.
   CPC .............. *B23C 3/00* (2013.01); *B23P 25/00* (2013.01); *B23B 2260/108* (2013.01); *Y10T 29/49995* (2015.01); *Y10T 29/54* (2015.01); *Y10T 82/10* (2015.01); *Y10T 407/28* (2015.01)

(56) References Cited

U.S. PATENT DOCUMENTS

| | | | | |
|---|---|---|---|---|
| 4,559,600 A * | 12/1985 | Rao | .................... | G05B 19/4163 340/680 |
| 4,707,688 A * | 11/1987 | Thomas | ............. | G05B 19/4065 340/680 |
| 4,807,167 A * | 2/1989 | Green, Jr. | ................ | G01D 3/02 330/284 |
| 4,831,365 A * | 5/1989 | Thomas | ............. | G05B 19/4065 340/680 |
| 4,911,044 A * | 3/1990 | Mishiro | ................ | B23B 29/125 82/158 |
| 4,918,427 A * | 4/1990 | Thomas | ............... | G08B 21/187 340/680 |
| 5,187,669 A * | 2/1993 | Wildes | ............... | G05B 19/4166 700/175 |
| 5,218,893 A * | 6/1993 | Shikata | .................... | B23B 1/00 82/1.11 |
| 5,271,301 A * | 12/1993 | Hiraoka | ................ | B23B 29/125 407/6 |
| 5,549,023 A * | 8/1996 | Strout | ....................... | B23B 5/04 82/112 |
| 7,198,043 B1 * | 4/2007 | Zhang | ....................... | B23B 1/00 125/39 |
| 8,205,530 B2 * | 6/2012 | Subramanian | ............ | B23B 1/00 82/1.11 |
| 2002/0067097 A1 * | 6/2002 | Inoue | ..................... | H01R 43/06 310/233 |
| 2008/0125015 A1 * | 5/2008 | Kawai | ....................... | B23B 5/00 451/11 |
| 2008/0238255 A1 * | 10/2008 | Lee | ....................... | B23B 29/125 310/323.18 |
| 2009/0138027 A1 * | 5/2009 | Lucas | .................. | A61B 17/322 606/132 |
| 2014/0102268 A1 * | 4/2014 | Hariki | .................. | B23B 29/125 82/118 |
| 2014/0216216 A1 * | 8/2014 | Hessenkamper | ..... | B23B 29/125 82/1.11 |
| 2015/0346707 A1 * | 12/2015 | Haga | .................... | G05B 19/182 700/160 |
| 2016/0266567 A1 * | 9/2016 | Watanabe | ........... | B23Q 15/013 |

FOREIGN PATENT DOCUMENTS

| | | |
|---|---|---|
| DE | 10 2010 048638 A1 | 1/2012 |
| JP | 62-140701 A | 6/1987 |
| JP | 2006-26778 A | 2/2006 |

OTHER PUBLICATIONS

International Preliminary Report on Patentability and Written Opinion of the International Searching Authority; Application No. PCT/EP2012/061345; Issued Dec. 17, 2013.

"Werkzeugmaschinen, Messtechnische Untersuchung und Beurteilung, dynamische Stabilitat", Manfred Weck, Christian Brecher; Dec. 31, 2006; Springer, Berline Heidelberg, XP002683422, ISBN: 3-540-22505-6, vol. 5, pp. 245-254.

* cited by examiner

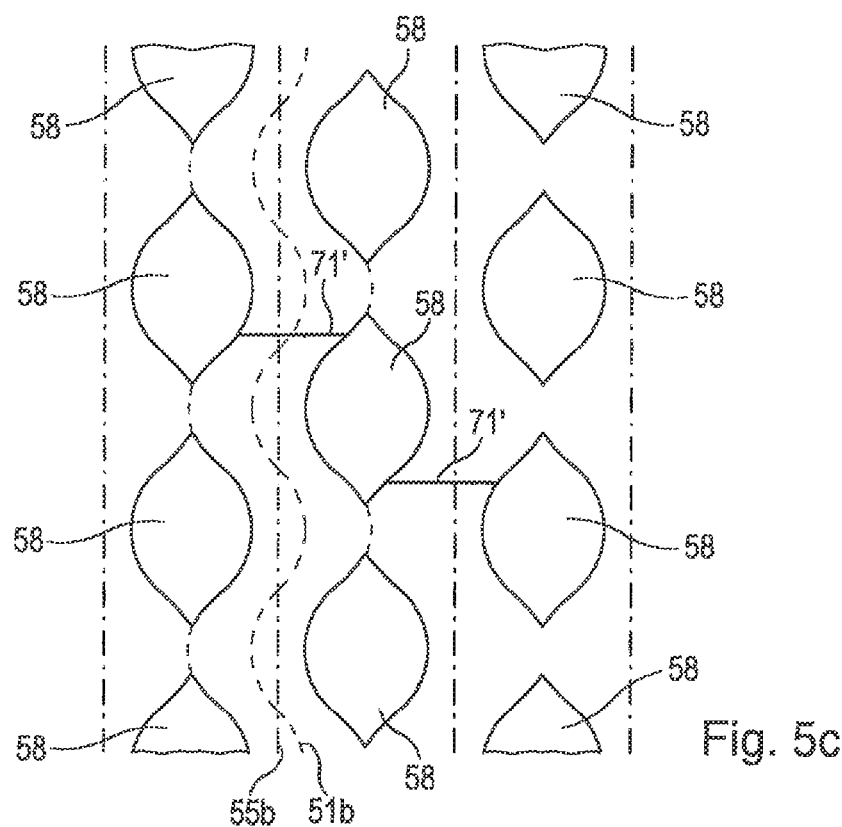
Fig. 5c
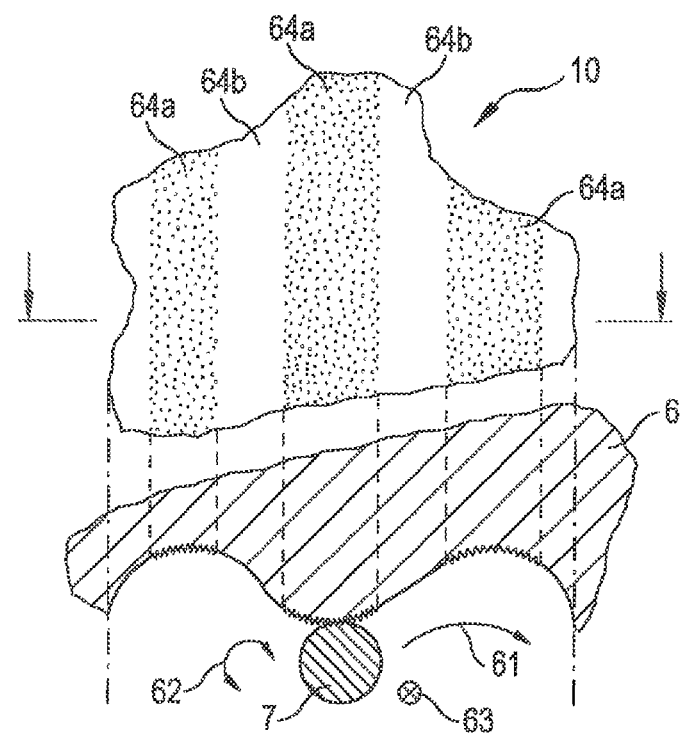
Fig. 6a
Fig. 6b

MACHINE TOOL, WORKPIECE MACHINING METHOD AND USE IN A MACHINE TOOL OR IN A WORKPIECE MACHINING METHOD

BACKGROUND

1. Field

The aspects of the disclosed embodiments relate to a machine tool and a workpiece machining method.

2. Brief Description of Related Developments

It has been known to machine workpieces by cutting using tools with defined cutting edges. The best known methods in this connection are drilling, turning, milling and planing. The associated tools have one or several distinctively defined, clearly describable cutting edges. Machining is performed by a relative motion between tool, in particular its cutting edge, and workpiece (cutting motion). It is performed involving a particular removal rate and a certain tool wear and produces surfaces of—to a certain extent—predictable characteristics. In the drilling process, as a rule, the tool is moved, in the turning process the workpiece is moved. In the milling process, as a rule, the milling tool rotates while it is displaced, or the workpiece itself is displaced. In the planing process, the tool or the workpiece can be displaced.

It has furthermore been known to machine workpieces by means of vibrating tools without defined cutting edges. The vibrating tools are rough, they work by grinding and vibrate at comparatively high frequencies (vibration motion), e.g. at frequencies above 5 kHz or above 10 kHz or above 20 kHz. Because of the high vibration frequencies, which can lie beyond human hearing range, the processing is often termed as ultrasonic machining, and the machine is called ultrasonic machine. The vibration of the tool can be a translatory or a rotatory vibration. The tool can move parallel to the surface along the workpiece and remove material in a quasi filing way. It can, however, also act upon the workpiece by hammering (vertically to its surface).

A disadvantage of the known machining methods using tools with defined cutting edges is that in certain machining situations, in particular in the case of specific workpiece materials, the removal rate is relatively low or the tool wear is relatively high or the surface quality of the workpiece to be machined is relatively poor. It becomes apparent that the breaking-out of chips when machining with conventional tools having defined cutting edges produces comparatively rough and chipped surfaces which are not optimally mechanically resistant and are sensitive to environmental influences (corrosion, rust).

A further disadvantage is that the workpiece surfaces are often only insufficiently adapted to use specifications of the workpiece with regard to their fine structures, and are either used in this state or must be reworked.

SUMMARY

It is the object of the invention to provide a machine tool and a workpiece machining method, which yield a desired fine structure of a produced workpiece surface.

In the case of a method for machining a workpiece using a tool, a relative cutting motion between the two and, superimposed thereon, a first vibration motion are induced in such a way that one or more characteristic values of the first vibration motion are adjusted in accordance with one or more characteristic values of the cutting motion. Vice versa, one or more characteristic values of the cutting motion can be adjusted in accordance with one or more characteristic values of the first vibration motion. The characteristic values of the vibration motion and/or those of the cutting motion can be variable during the machining of the workpiece.

In the case of a method for machining a workpiece using a tool, in particular as above, a relative cutting motion between the two and, superimposed thereon, a first vibration motion are induced in such a way that distinctive surface zones of the workpiece are generated. The first vibration motion can be controlled in accordance with the position of the tool and, preferably, also in accordance with data describing the workpiece to be produced.

In a method for machining a workpiece by using a tool, in particular as above, a relative cutting motion between the two and, superimposed thereon, a first vibration motion are induced in such a way that the produced surface is changed as compared to a machining without first vibration motion.

Adapted tools can be used, particularly tools, the cutting edges of which have structures in the order of magnitude of the amplitude of the first vibration motion.

BRIEF DESCRIPTION OF THE DRAWINGS

In the following, individual embodiments of the invention are described with reference to the drawings, wherein:

FIG. 6 are illustrations for the generation of distinctive surface zones, and

DETAILED DESCRIPTION OF THE DISCLOSED EMBODIMENTS

First Embodiment

A machine tool comprises a cutting tool for the machining of a workpiece by a cutting motion of the tool relative to the workpiece and a vibration unit for generating a vibration motion between tool and workpiece. In a workpiece machining method a relative cutting motion between a cutting tool and a workpiece and, simultaneously or alternately thereto, a vibration motion are induced.

The combination of cutting and vibrating processing has the advantage that the separation of chips from the workpiece by means of the defined cutting edge of the tool is performed by variable relative motions between workpiece and cutting edge. Thus, the chips are separated in a less tearing way, but increasingly in a cutting way. In this way less rough surfaces are generated, and, after machining, the workpiece surface has a relatively high residual compressive stress and is less torn and furrowed, what is desirable with regard to hardness and resistance of the surface to environmental influences and mechanical loads.

The vibration unit is preferably located near the tool. It can comprise one or several piezoactuators or electromagnetic actuators. The vibration frequency can be above 5 kHz, above 10 kHz, above 20 kHz or above 40 kHz. The machine tool can be a drilling machine, a milling machine, a turning machine, a planing machine, or the like. The direction of the vibration motion can be in parallel and/or at right angle to the cutting motion of the tool or can include an angle therebetween. It can be in parallel to the local momentary workpiece surface or can be at a specific angle relative thereto, which is larger than 0°. It can be at right angle to the workpiece surface.

The tool can be adapted to the potential vibration motion, e.g. in that certain faces or edges of the same are roughened, serrated or otherwise modified as compared to conventional tools. The modification can be of a kind that the tool has specific resonance frequencies or avoids the same.

The vibration unit can be part of a quick-change (automatically exchangeable) tool, and can receive energy from suitable devices. For example, a contactless (inductive) energy transmission can be provided.

A control/feedback control can control/feedback control the cutting motion and the vibration motion.

There can be provided sensors for detecting process parameters, and the process parameters can be fed back to the control system. Controlling the cutting motion and the vibration motion can be performed independently of each other or in a crossed way. One motion can be controlled or feedback controlled in accordance with control parameters or measurement parameters of the other one.

Cutting motion and vibration motion can each be individually implemented either simultaneously with each other or, alternatively, independently of each other.

Figure 1:
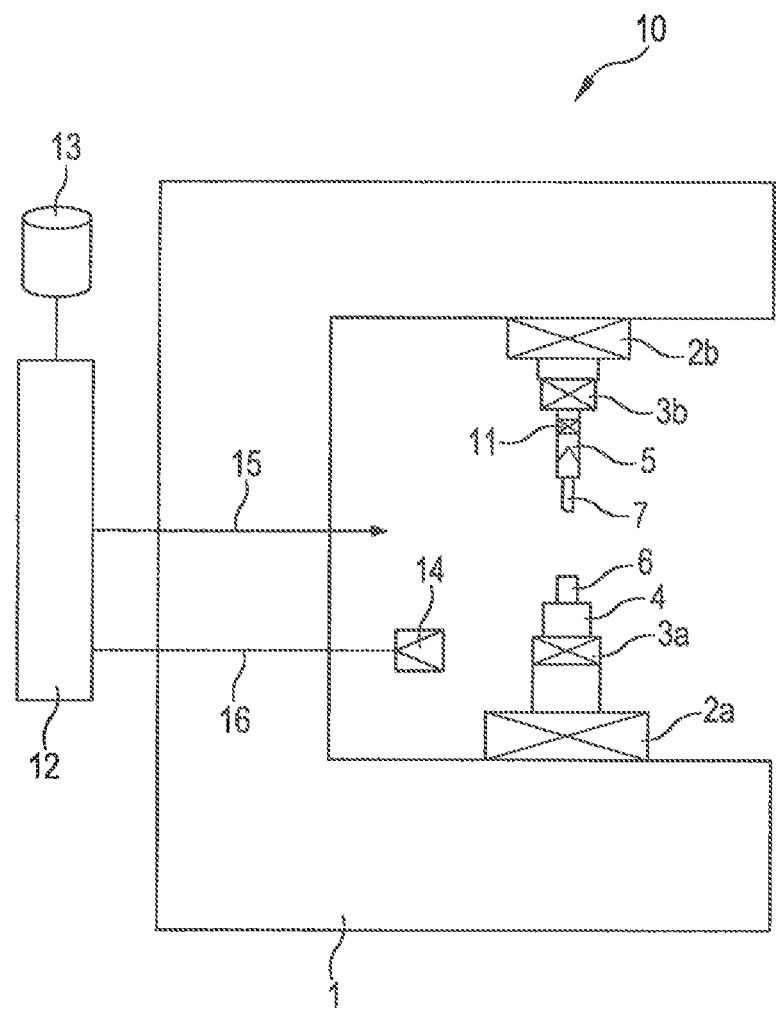
FIG. 1 schematically shows a view of a machine tool.

FIG. 1 schematically shows a machine tool 10. It has a machine frame 1. In operation, on the one hand, the workpiece 6 and, on the other hand, the tool 7, are fitted to the machine frame 1 via various intermediate links. There can be provided several adjusting axes 2a, 2b for the static adjustment of the translatory and/or rotatory positions of the tool and/or the workpiece. There can be provided adjusting axes 2a between machine frame 1 and workpiece table 4 and/or adjusting axes 2b between machine frame 1 and tool 7.

Furthermore, at least one drive 3a, 3b for the cutting tool or the workpiece table or the workpiece holding fixture is provided. Generally, the drive can be electrically operated and can have a mechanical step-up gear unit or a step-down gear unit. The tool can be a milling cutter, in particular an end mill cutter, which, during the workpiece processing, is electrically driven to be made to rotate. In the case of a drilling tool, the drive 3b can, e.g., be an electric motor with a transmission, which makes the drilling tool 7 or the drill chuck to rotate. In the case of a turning machine, the drive 3a can be an electric motor with transmission, which makes the lathe chuck to rotate. Generally, a drive 3a can be located between machine frame 1 and workpiece 6, and/or a drive 3b can be placed between machine frame 1 and tool 7.

The tool 7 can be exchangeable via a quick-lock coupling 5, 5a and/or via a tool interface 5b, so that it can be exchanged quickly and, where required, also automatically. The quick-lock coupling 5, 5a can be a usual cone clutch with a tool-side cone 5a and a matching machine-side seat or the like. The tool interface 5b can directly be located at the actual tool and comprise a seat for a tool shank, and can have a collet chuck or the like. The workpiece 6 can be placed on a workpiece table 4 and can be clamped thereon.

There is provided a vibration unit 11 which, in addition to the conventional cutting motion between tool 7 and workpiece 6, induces a relative vibration motion between the two. In FIG. 1 an embodiment is schematically shown, where the vibration unit 11 is located at the frame-side end of a quick-lock coupling 5a. However, other positions of the vibration unit 11 in the power flow are also possible. The vibration unit can also be located closer to the tool, e.g. at the tool-side of the quick-lock coupling 5, in this case the further mentioned tool interface 5b can additionally be placed between the vibration unit 11 and the tool. The vibration unit 11 can also be placed near the workpiece table 4, e.g. between the workpiece table 4 and the drive 3a, or at the actuators 2a, or at the machine frame 1.

In the shown embodiment, the vibration unit 11 is designed for actuating the tool 7 in a vibrating way. The vibration can be a linear vibration or a rotational vibration.

A linear vibration can have directional components in parallel and/or vertically to the local workpiece plane. In the case of a drilling machine, the vibration can take place along the drill axis. In the case of a turning machine, the turning tool can be made to vibrate. In the case of a milling machine, the milling cutter or the workpiece can be made to vibrate.

A rotational vibration can take place around a rotation axis already present in the machine and can be introduced by a suitably arranged and actuated vibration unit. It can generally be introduced into the component of the machine (e.g., in the case of a drilling machine, drill chuck or drilling tool), to which a rotational motion has already been applied. However, around the same axis, it can also be introduced into the respectively opposite part of the component, to which a rotational motion has been applied (in the case of a drilling machine into the workpiece table or into the workpiece). In the case of a turning machine, a rotational vibration around the axis of rotation can be applied to the lathe chuck. In a milling machine, a rotational vibration can be applied to the milling tool around its axis.

A plurality of vibrations, and in particular rotational vibrations and linear vibrations, can be introduced via several vibration units simultaneously and in such a way that they are superimposed on each other. When there are provided a plurality of vibration units, some can act upon the workpiece or the workpiece table, and some upon the tool or the tool holding fixture.

A vibration unit can comprise one or a plurality of vibrators, e.g. piezo elements. They can receive the same or different signals. The difference can be a phase displacement or an inversion.

The vibration frequency can be above 5 kHz or above 10 kHz or above 20 kHz or above 40 kHz. The vibration unit 11 and the drive 3a, 3b can be actuatable at the same time or each one can be actuatable individually and alternately. The control system can be designed for both modes of operation (simultaneous operation, alternate operation).

The machine tool 10 can generally comprise a sensor system 14 for detecting process parameters. The sensor system can comprise one or a plurality of sensors distributed across the machine tool. Via lines 16 the signals are fed back to the control/feedback control system 12 and, there, they are recorded and/or output and/or considered, on their part, for the activation of the various machine components. The control system 12 has activation lines 15 leading to the individual components of the machine, i.e. in particular leading to the drives 3a, 3b, the adjusting axes 2a, 2b and to the vibration unit 11.

Additionally, a—not shown—output unit for the operating staff can be provided. 13 symbolizes a memory (e.g. a semiconductor memory and/or a disk storage) which, on the one hand, comprises, e.g., a processing program for the workpiece and, on the other hand, characteristic values for the cutting motion, for the vibration motions or for the dependencies on drive parameters, in particular for the cutting motion and for the vibration motion, on input parameters or determined/measured parameters (by tables or formulas). The control system can have access to the memory and, there, access, e.g., two- or multi-dimensional tables for calculating control variables from input variables.

In the vibration unit 11, the individual parameters can be adjustable/controllable, in particular the vibration frequency, the vibration amplitude, the waveform of the actuating signals, the direction of vibration, and the like. One single parameter or a plurality of parameters can be feedback-controlled, i.e. can be adjusted in accordance with detected feedback values.

Figure 2:
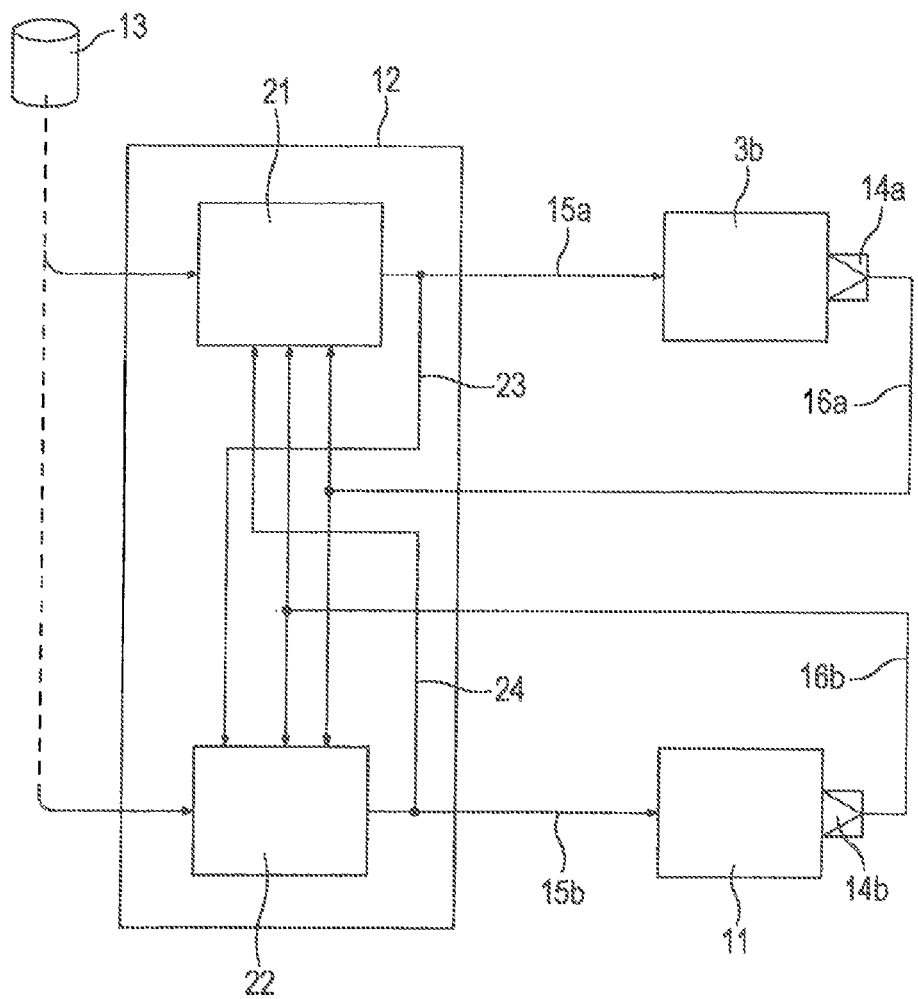
FIG. 2 schematically shows a control system of the machine tool.

FIG. 2 schematically shows the feedback loop part of a control system. 12 symbolizes the feedback controller of FIG. 1. The program-related part which can also be present is not shown. In this part a processing program can be stored which controls the individual machine components and respectively presets control parameters and target values for control and feedback control systems. The control system 12 can be designed as a digital control system and, at the interface to the process, it can comprise analogue/digital converters which are not shown. In dependence on the respective operating state, the control system 12 or feedback control system 12 can comprise set values which are taken, e.g., from a memory 13 or are determined by the mentioned control program.

In FIG. 2 the control system 12 is schematically shown as consisting of two parts, namely, on the one hand, a feedback controller 21 for the conventional drive 3*b* of the cutting tool 7, e.g. for an electric motor for a drill. The real process is symbolized here by box 3*b*. 14*a* symbolizes a sensor system relating to the conventional cutting motion which is fed back via line 16*a*.

There is provided a further feedback controller 22 which controls/feedback-controls the vibration motion according to the invention. Via line 15*b* it outputs signals to the real process, in particular to the vibration unit 11. 14*b* symbolizes a sensor system for vibration-specific values which can be fed back via line 16*b*.

Basically, vibration motion and cutting motion can be implemented simultaneously or alternately. Controlling the individual motions can be performed independently of each other at a control or feedback control level in accordance with respective individual pre-set specifications, or it can be performed in a crossed manner by, e.g., also introducing output signals 15*a* for the conventional cutting motion drive into the feedback controller 22 for the vibration drive (line 23) and/or vice versa, by introducing output signals 15*b* for the vibration drive 11 into the feedback controller 21 for the cutting drive (line 24). The feedback of signals 16*a*, 16*b*, if it is provided, can also be performed in a "crossed" manner, i.e. by feeding process signals regarding the cutting motion (line 16*a*) to the feedback controller 22 for the vibration drive, and/or vice versa, by feeding process signals regarding the vibration motion (line 16*b*) to the feedback controller 21 for the cutting motion. The connection and cross-connection of the individual parameters can be performed by means of formulas or based on tables which are suitably stored and held available.

However, there can also be provided a comparatively simple control system which, if appropriate, controls the cutting motion and the vibration motion completely without feedback, simply in accordance with set values; these set values, however, can, of course, have been determined in relation to each other.

There can be provided one or more vibration units 11. For example, a first vibration unit 11 can be provided near the tool 7, and a second vibration unit 11 near the workpiece 6 or the workpiece table 4. They can be adapted so that they can be individually controlled/feedback-controlled or can be controlled/feedback controlled in relation to one another, in a similar way as it was explained with regard to the cutting motion control 21 and the vibration motion control 22 with reference to FIG. 2. One single vibration unit 11 can also be adapted for the vibration along several axes, and the individual axes can be actuatable independently of each other.

Reference is made to the fact that FIG. 2 shows only parts of the overall control system. What is not shown are the control systems of the conventional components (e.g. adjusting axes, tool changers), which, however, can also be present. The control system 12 can be part of a process computer which is equipped in accordance with the requirements.

The sensor system in the machine tool 10 can comprise one or a plurality of the following sensors, in which case the term "sensor" can also comprise quite complex evaluation mechanisms: sensor for vibration amplitude or vibration amplitude variation within the range of the frequency of the vibration unit 11, sensor for voltage and/or current at one of the drives, in particular at the vibration drive 11, where applicable also for the phasing between voltage and current at the respective drive, and, where applicable, for the variations of the respective values (current, voltage, phase), sensor for the feed rate of the cutting process. Additional sensors can be provided.

Figure 3:
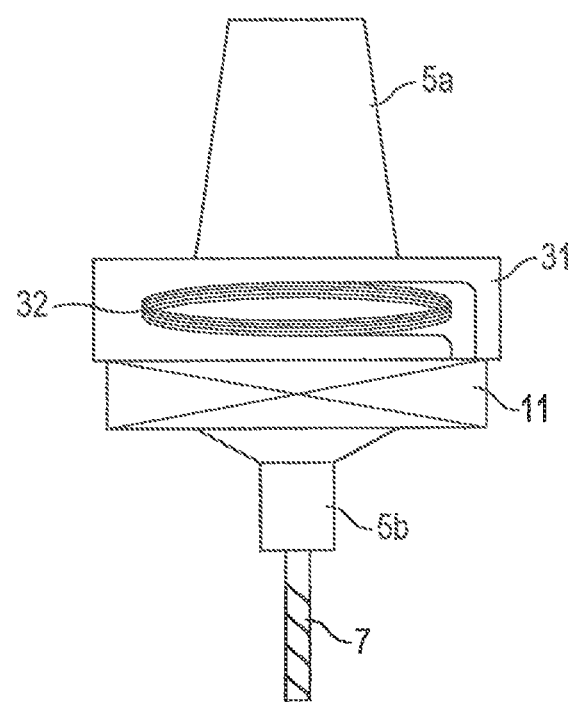
FIG. 3 schematically shows a tool.

FIG. 3 schematically shows an embodiment of a quick-change tool unit 30. It comprises the actual tool 7, e.g. an end mill cutter. Moreover, it comprises the vibration unit 11. Furthermore, it has a power supply 31 and a coupling part 5*a* for connecting the tool unit 30 with the machine tool. The coupling part 5*a* can be a common cone clutch or the like. Between vibration unit 11 and tool 7 there can be provided the tool interface 5*b* which allows the exchange of the tool 7.

The vibration unit 11 can be an electromechanically actuated vibration unit or a piezoelectrically actuated vibration unit. In both cases electric energy is necessary. It can be provided via a conventional electrical connection which, in the case of rotating tools, would have to be designed as a slip ring and, thus, would be relatively complicated. The energy supply can, however, also be a wireless supply, e.g. by induction, by providing, e.g., an induction coil 32 in the tool unit, relatively to which there changes an external magnetic field indicated by arrow 33. For example, the coil 32 can be in a plane vertical to the axis of rotation of a rotating tool and can be penetrated by an external magnetic field alternating at a specific frequency. The coil can, however, also be oriented in such a way that, in a static external magnetic field, it experiences a changing magnetic field through the coil surface already because of the rotational motion of the tool. Thus, an induced alternating voltage comes into existence, which can directly be fed to the actuators. However, also further (not shown) electric and electronic elements for the voltage formation can be provided.

The advantage of the embodiment of FIG. 3 is that it is relatively easy to use a tool unit 30 designed in such a way in a conventional machine tool 10. In particular, no electric contacts must be provided. For guaranteeing the sufficient efficiency of the inductive coupling, it can, however, be necessary, that locally a suitable magnetic field is generated.

Figure 4A:
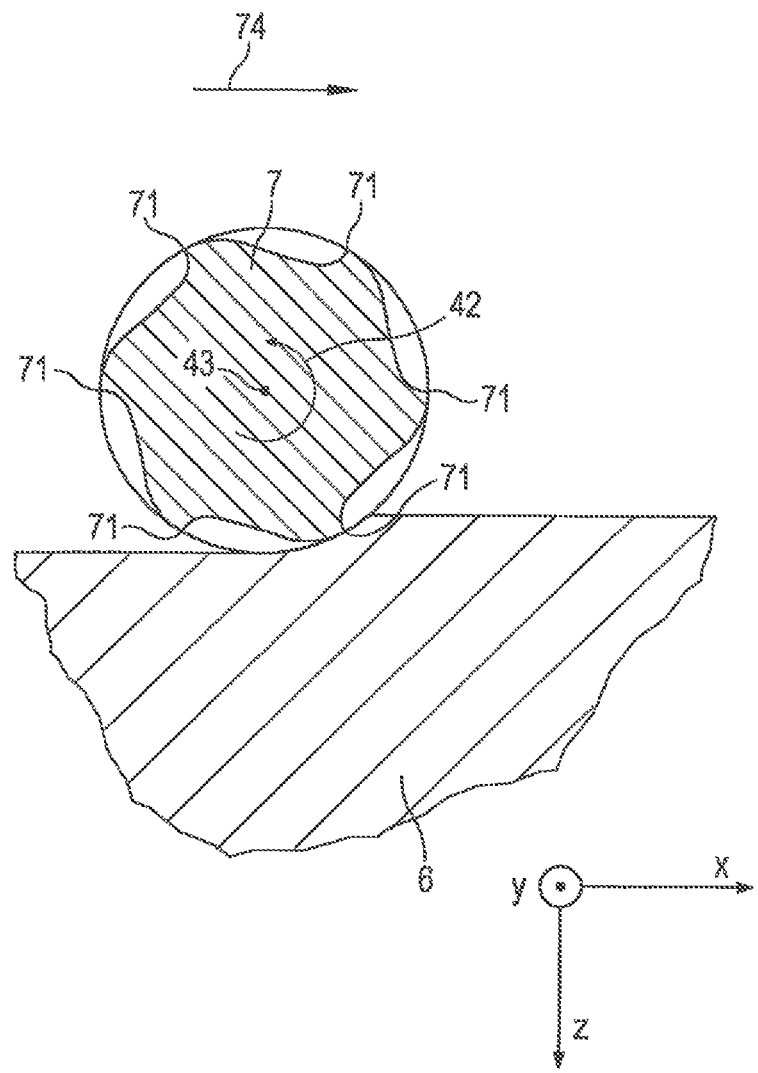
FIG. 4 schematically shows directional indications.

FIG. 4*a* schematically shows an illustration for explaining directional indications in the case of a milling cutter as the tool 7. There is schematically shown an end mill cutter working onwards from the left to the right side across a workpiece surface (arrow 74). According to arrow 42 it rotates counterclockwise about axis 43. 71 are the cutting edges of the end mill cutter. The relative cutting motion between milling cutter 7 and workpiece 6 also extends in the direction of arrow 74 (x-direction). The vibration motion can be at right angle thereto, approximately vertically to the plane of projection (y-direction). The direction of vibration can, however, also differ from the one shown, e.g. along the x-direction or along the z-direction, or it can be oblique to these directions.

Figure 4B:
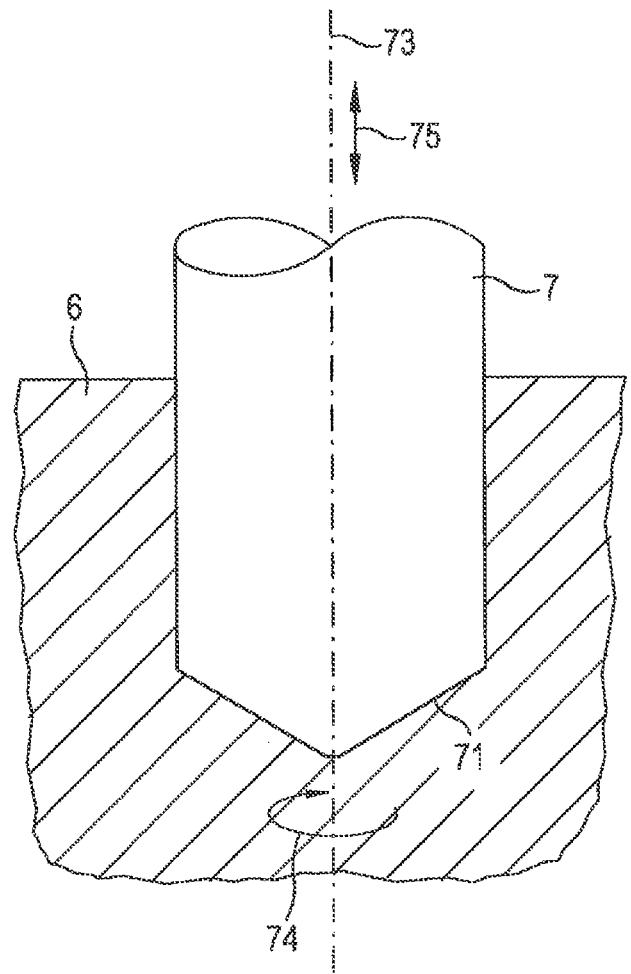

FIG. 4*b* schematically shows an illustration for explaining directional indications in the case of a drill as the tool 7. There is schematically shown a drill 7 immersed in a workpiece 6. 71 symbolizes a cutting edge of the drill. In conventional operation the drill 7 rotates about its axis 73 as indicated by arrow 74. Each point on the cutting edge 71 then performs a circular cutting motion as indicated by arrow 74. According to the invention, a vibration motion can be superimposed on the cutting motion symbolized by arrow 74, or the motions 75, 74 are performed alternately. FIG. 4*b* shows an embodiment in which the vibration motion is performed along arrow 75, i.e. in the direction of the drill axis 73 (z-direction). The vibration motion 75 is not parallel to the direction of the cutting motion 74. It can be approximately at right angle thereto or, in particular, in the direction of the drill axis. In the shown embodiment, it is not parallel to the local workpiece surface below the cutting edge of the drill. Rather, it hammers to some extent into the surface.

As compared to conventional tools, the tool can be designed for the also vibrating motion. E.g., certain faces or edges of the tool can be roughened or can be modified in a specific way as compared to conventional tools. In particular, e.g. the cutting face of a tool or the cutting edge of a tool or the tool flank may be roughened or serrated, at least in certain areas, in order to make it possible to adjust the efficiency of the vibration motion in the desired way. The tool can also be designed in such a way that, with regard to the desired vibration stimulation, specific resonance frequencies of the tool are given or, in specific frequency ranges, are avoided. There can be a pregiven detuning (difference) between the resonance frequency of the tool and the stimulation frequency of the vibration, which can be controlled or, if required, can also be held feedback-controlled. The tool can be designed by specifically adding material to or removing material from the tool.

The above described features of the invention can be summarized and listed as follows:

1. Machine tool (10) comprising a tool (7) having a defined cutting edge (71) for the machining of a workpiece by a cutting motion (74) of the tool (7) relative to the workpiece (6), and a vibration unit (11) for generating a vibration motion (75) between tool (7) and workpiece (6).

2. Machine tool according to above 1, wherein the vibration unit (11) is designed for causing a vibrating motion (75) of the tool (7) or the workpiece table (6).

3. Machine tool according to above claim 1 or 2, wherein the vibration unit (11) is designed for generating a vibration (75) reversing along a direction which is parallel or at right angle to the direction of the cutting motion (74) or extends at a particular angle relative thereto.

4. Machine tool according to above 1 to 3, wherein the tool (7) is a drill, a milling cutter, in particular an end mill cutter, a planing tool or a turning tool.

5. Machine tool according to above 1 to 4, wherein the tool (7) is an end mill cutter or a drill, and the vibration unit (11) is designed for causing the end mill cutter or the drill (7) to vibrate in a direction (75) in parallel or vertically to its axis of rotation (73) or at a specific angle to this axis.

6. Machine tool according to above 1 to 5, comprising several vibration units (11) actuatable dependently on each other or independently of each other.

7. Machine tool according to above 1 to 6, wherein the vibration unit (11) comprises an electromagnetic or a piezo-electric drive, and preferably works at a vibration frequency higher than 5 kHz or higher than 10 kHz or higher than 20 kHz.

8. Machine tool according to above 1 to 7, comprising a control system (12) for controlling the cutting motion (74) and for controlling the vibration motion (75).

9. Machine tool according to above 8, comprising a device (21) for controlling one or a plurality of adjustable parameters of the cutting motion (74) in accordance with one or a plurality of adjustable or determined parameters of the vibration motion (75), and/or comprising a device (22) for controlling one or a plurality of adjustable parameters of the vibration motion (75) in accordance with one or a plurality of adjustable or determined parameters of the cutting motion.

10. Machine tool according to above 8 or 9, comprising one or a plurality of sensors (14) for detecting one or a plurality of parameters regarding the cutting motion (74) and/or regarding the vibration motion (75), in particular of the vibration amplitude and/or the voltage and/or the current at one or a plurality of the actuators and/or the phasing between two among the mechanical vibration, the voltage and the current of the vibration unit (11), and/or of the feed rate (77) of the cutting process.

11. Machine tool according to above 8 to 10, wherein the control system (12) can induce the cutting motion (74) and the vibration motion (75) simultaneously or, by means of the same tool, each one individually.

12. Machine tool according to above 1 to 11, wherein the tool (7) has a cutting face or tool flank or cutting edge that is roughened at least in areas thereof.

13. Machine tool according to above 1 to 12, wherein the tool (7) can be exchanged, and the vibration unit (11) is provided in the exchangeable tool, with the vibration unit (11) preferably comprising a device (31-35) for the wireless reception of energy.

14. Workpiece machining method, wherein a cutting motion and a vibration motion are induced relatively between a tool with a defined cutting edge and a workpiece, and the cutting motion and the vibration motion can be used simultaneously as well as each one individually.

15. Method according to above 14, wherein the vibration is performed along a translatory axis and/or about a rotatory axis.

Second Embodiment

In a method for machining a workpiece using a tool, a cutting motion and, superimposed thereon, a first vibration motion are induced relatively between the two in such a way that one or more characteristic values of the first vibration motion are adjusted in accordance with one ore more characteristic values of the cutting motion.

During machining of the workpiece, the characteristic values of the cutting motion as well as those of the vibration motion can, at least for some time, be constant, but can also vary.

In a method for machining a workpiece using a tool, in particular as above, a cutting motion and, superimposed thereon, a vibration motion are induced relatively between the two in such a way that the vibration motion causes distinctive surface zones and/or fine structures of the surface of the workpiece. The first vibration motion can be controlled in accordance with the position of the tool and, preferably, also in accordance with data describing the workpiece to be produced.

In a method for machining a workpiece using a tool, in particular as above, a cutting motion and, superimposed thereon, a vibration motion are induced relatively between the two in such a way that the produced surface is changed as compared to a machining without first vibration motion.

The superimposed first vibration motion can extend in one spatial dimension or in two spatial dimensions (e.g. in a plane parallel to the momentary workpiece surface) or in all three spatial dimensions.

The vibration motion can be modulated. The modulation can be performed in accordance with variables of the cutting motion and/or in accordance with workpiece data and/or in accordance with the machining progress and/or in accordance with external variables such as time or external inputs.

An adapted tool can be used, in particular a tool having one or more geometrically defined cutting edges and the cutting edge(s) of which is/are adapted to the amplitude of the vibration motion, in particular in such a way that an area of the cutting edge has a structure, the dimensions of which are in the order of magnitude of the amplitude of the first vibration motion. The structure of the area of the cutting edge can, e.g., be such that one cutting edge has a length corresponding to the mentioned dimensions. In a tool, an actually continuous cutting edge can also be divided into several areas by one or a plurality of recesses, with the lengths of the recesses and/or the lengths of the cutting edge areas and/or the step width from area to area corresponding to the mentioned dimensions. The recesses themselves can, in turn, be formed as cutting edges, so that a tool with stepped cutting edge results.

With the aspects mentioned above and in the following the features of the first embodiment can be further developed; they can be combined with each other as far as this is not technically excluded.

As far as motions between tool and workpiece are addressed, these are relative motions between the two, without necessarily connecting a statement therewith which one of the two components is actually moved (relative to the machine frame as the reference system). This can be defined separately.

Figure 5A:
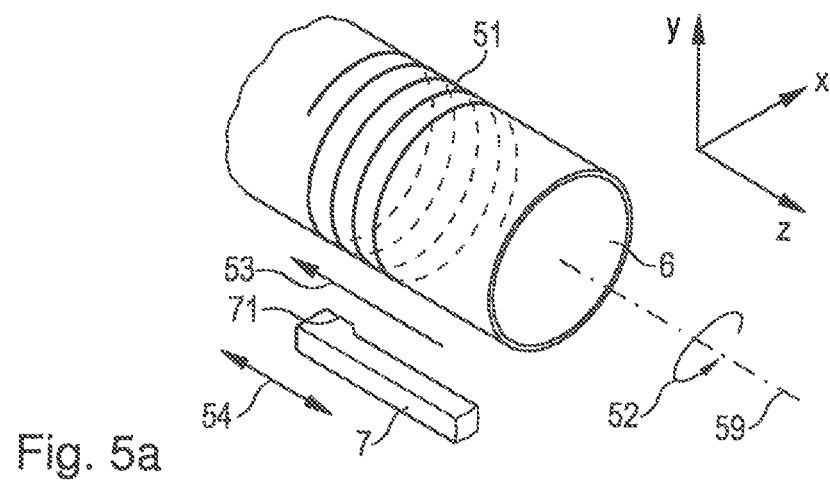
FIG. 5 are illustrations for the matched determination of motion parameters.
Figure 5B:
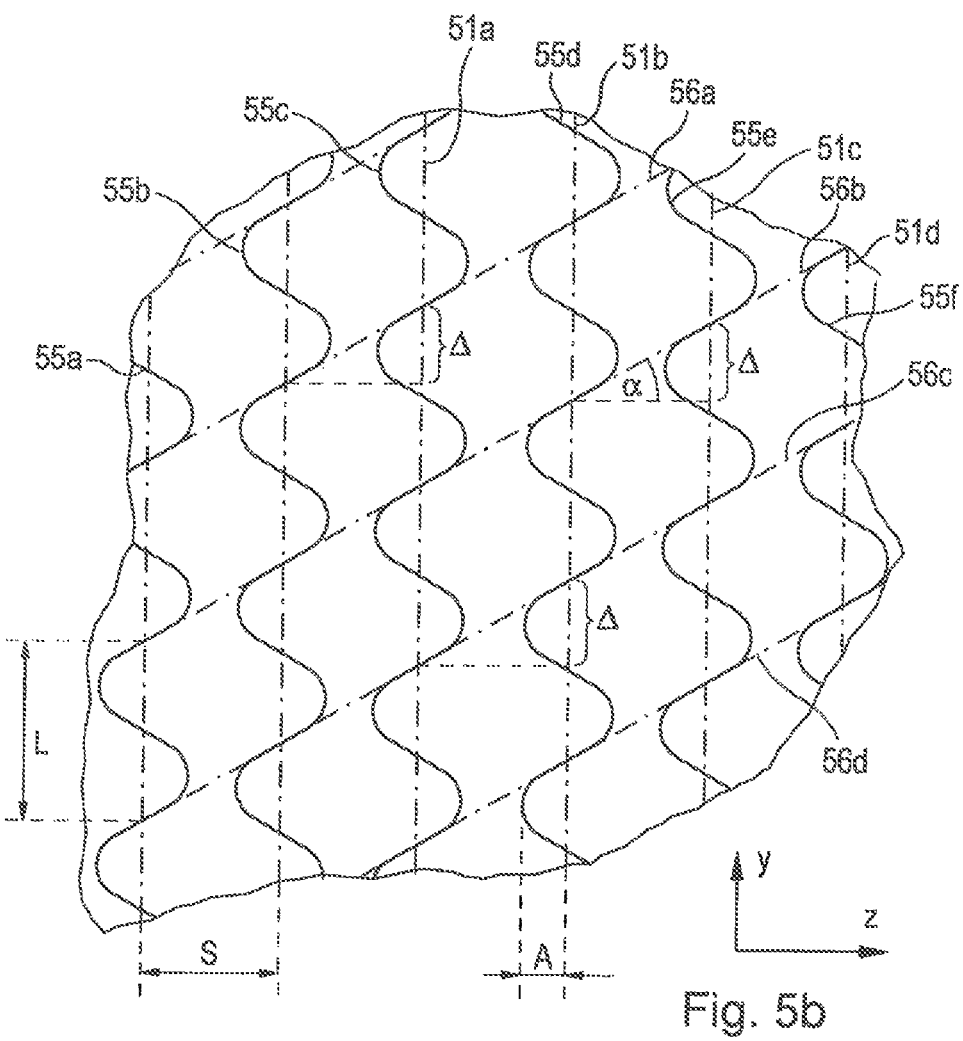

FIG. 5 exemplarily shows a possibility of adjusting one or a plurality of parameters of the vibration motion and one ore a plurality of parameters of the cutting motion in relation to one another. FIG. 5a is a schematic/perspective view of the configuration, whereas FIG. 5b is a schematic plan view of a produced workpiece surface after machining. It is assumed that the machine is a turning machine and, accordingly, the tool 7 is a turning tool having a cutting edge 71. The workpiece 6 rotates along arrow 52 about axis 59 which extends in z-direction. The turning tool itself is advanced linearly along arrow 53. Thus, on the workpiece surface, there basically results a spiral path—indicated by the spiral 51—as the cutting motion of the tool 7 on the workpiece 6.

A vibration motion 54 is superimposed on the feed motion 53 of the cutting motion. In the shown embodiment, it is a linear vibration motion which extends in parallel to the feed motion 53. Along direction 54 (in parallel to 53 and axis 59 and z-axis) the turning tool vibrates, e.g. by being caused to vibrate by an appropriate drive. The vibration of the turning tool is characterized, in addition to the quality (translatory or rotatory) and the direction (arrow 54), also by the frequency, the amplitude and possibly also the waveform of the vibration motion. One or a plurality of these parameters can be determined in relation to one or a plurality of the parameters of the cutting motion (rotation 52, feed 53). Characteristic values of the tool can also be used for the dimensioning of one or more characteristic values of the vibration motion.

E.g., the frequency fv of the first vibration motion and the rotational frequency of the workpiece fs can satisfy the formula fv=(n+k1)*fs, with n being an integer and k1 being a displacement between 0 and 1. When, e.g., n=100 and k1=0.5, 100.5 vibrations of the workpiece take place per rotation of the workpiece, so that, seen in circumferential direction, a minimum value of the vibration excursion in the later revolution meets with a maximum value of the vibration excursion in the earlier revolution. When, additionally, the feed rate vs (cutting motion according to arrow 53) and the cutting edge length ls are suitably dimensioned, there result certain patterns on the produced workpiece surface. FIG. 5b shows an example for this.

In FIG. 5b the dash-dotted lines 51a, 51b, 51c, . . . show individual windings of the spiral shown in FIG. 5a. Reference is made to the fact that, of course, these structures cannot be seen as such on the workpiece surface, but are only marks for ideal paths which, in the shown way, cannot be seen in reality. The lines 55a, 55b, 55c, . . . show a superimposed motion which results from the superposition of cutting motion (arrows 52, 53), on the one hand, and vibration motion (arrow 54), on the other hand. Lines 55a, too, are ideal representations of ideal paths. However, it appears that maxima and minima of adjacent tracks 55 have a defined phasing Δ relative to each other, so that, e.g., macrostructures evolve as they are indicated by lines 56a, 56b, 56c, . . . .

FIG. 5c schematically shows a structure as it can actually be produced by a vibrating tool on the workpiece surface. 51 and 55 again designate the macroscopic spiral path or the vibrating path of the tool. 71' designates at two positions the length of the cutting edge 71 of the tool 7. In this connection, the dashes 71' are only meant to be schematic positional indications of the cutting edge at a specific point of time of the machining process. The cutting edges clear out the furrows which, when the working parameters are suitably selected, lead to overlappings of maxima and minima in the individual revolutions, so that, e.g. as shown, there can remain islands 58. In this way, a structured surface is generated which has patterns which have not been formed accidentally.

The size and the absolute and the relative positions of the structures to each other depend on the individual parameters of the vibration motion, on the one hand, and of the cutting motion, on the other hand. The various parameters can, at least for some time, constantly satisfy one or more of the following formulas and can be accordingly selected or set or adjusted:

$$fv=(n1+k1)*fs \quad (1)$$

$$av=k2*vs/fs=k2*ss \quad (2)$$

$$ls=k3*av=k4*ss \quad (3)$$

The quantity fv is the vibration frequency of the first vibration motion, fs is the rotational frequency (rotational speed) of the rotating part, av is the amplitude of the vibration motion which can be directed vertically to the rotational motion and vertically or in parallel to the workpiece surface, vs is the feed rate of the turning tool, ss is the step width of the feed per revolution, ls is the length of the cutting edge 71 or of cutting edge segments 71a, 71b, n1 is an integer, and k1 to k3 are real fitting parameters. With k1 ranging from 0 to 1 a phase displacement between 0° and 360° corresponding to Δ in FIG. 5b can be effected. When k2=0.5, the central lines of the maxima of the individual revolutions just make contact. When k4 is smaller than 1, the turning tool clears out a track which is less broad than is the step width ss, so that there is material left. If, however, k4 is larger than 1, there is not left any material. Altogether, k4 can be a factor, the lower limit of which can be 0.01 or 0.02 or 0.05 or 0.1 or 0.2 or 0.5, and/or the upper limit of which can be 0.1 or 0.2 or 0.5 or 1 or 2.

In the above, an embodiment was described in which the vibration motion 54 is parallel to the workpiece plane. However, there can also be embodiments, in which the superimposed vibration motion 54 is vertical to the workpiece plane. In FIG. 5a this would be a vibration towards the rotation axis 59 and again away therefrom. Then, there result cleared-out tracks of different depths on the workpiece surface through the cutting edge 71 of the turning tool 7. In this way, at a suitable phasing Δ, there can, e.g., occur channels which, at Δ=0, extend in parallel to the rotation axis 59, and at Δ≠0, can extend obliquely to the rotation axis. The cutting edge length is can then be larger than the step width ss per revolution.

When a workpiece is machined by milling, parameters can be selected or set or adjusted to be constant for at least some time according to one or more of the following equations:

$$fv = vs/lw \quad (4)$$

$$\phi = k5 * \pi \quad (5)$$

The quantity fv is the vibration frequency of the first vibration motion, vs is the feed rate of the cutting edge on the workpiece surface, and lw is the wavelength of the pattern of the vibration, which is formed on the workpiece surface. φ is the phase displacement in feed direction of the cutting edge between several pairs of patterns in adjacent milled tracks, and k5 is a factor which can range from −1 to 1. Thus, a phase displacement between adjacent milled tracks, which is constant over several tracks, can be adjusted, which can also be 0.

In the case of drilling, parameters can be selected or set or adjusted to be constant at least for some time according to one or more of the following equations:

$$fv = (n2 + k6) * fs \quad (6)$$

$$av = k7 * vv/fs \quad (7)$$

$$ls = k8 * av \quad (8)$$

The quantity fv is the vibration frequency of the first vibration motion, fs is the rotational frequency (rotational speed) of the drill, av is the amplitude of the vibration motion which can be directed vertically to the rotational motion and vertically or in parallel to the workpiece surface, vv is the feed rate of the drill along the drill axis, ls is the length of cutting edge segments 71a, 71b at the lateral edge of the drill defining the angle of twist, n2 is an integer, and k6 to k8 are real fitting parameters with 0≤k6, k7, k8<1.

When the cutting motion is a second vibration motion of a tool advanced across the workpiece surface, parameters can be selected or set or adjusted to be constant at least for some time according to one or more of the following formulas:

$$fv1 = k6 * fv2 \quad (9)$$

$$\phi2 = k7 * \pi \quad (10)$$

$$fv1 = vs/lw1 \quad (11)$$

$$fv2 = vs/lw2 \quad (12)$$

$$lw1 = k8 * lw2 \quad (13)$$

The quantities fv1, fv2 are the vibration frequencies of the first and the second vibration motion, respectively, φ is an adjustable phase displacement between the two vibrations, when they have the same frequencies or a rational frequency ratio, which displacement can also be 0. The quantity vs is the feed rate of the tool on the workpiece surface, and lw1 and lw2 are the wavelengths of the patterns of the first and second vibration, respectively, which are formed on the workpiece surface. k6 is a factor which can be an integer or a reciprocal integer. It can also be rational with low numbers in the numerator and in the denominator (e.g. ½, ⅓, ¼, ⅕, ⅔, ⅖, ¾, ⅗, ⅘) or reciprocally thereto, so that there result appropriate combined Lissajous vibration patterns of the tool on the workpiece surface. k8 is a factor which can be an integer or a reciprocal integer. It can also be rational with low numbers in the numerator and in the denominator, as indicated above.

Generally, one or more characteristic values of the first vibration motion can be adjusted in accordance with one or more characteristic values of the cutting motion. And, vice versa, also one or more characteristic values of the cutting motion can be adjusted in accordance with one or more characteristics values of the first vibration motion. In the above-mentioned formulas (1) to (13) the value on the left side of the respective formula can be determined and subsequently set in accordance with the values on the right side. However, the formulas can also be solved for a value on the right side, so that this value can then be determined and set.

The above-mentioned embodiments were described with reference to a tool with geometrically defined cutting edge (turning tool, drill, milling cutter, . . . ). They can qualitatively and quantitatively also be applied to tools with geometrically undefined cutting edge, e.g. ultrasonic tools.

What has previously been described has been the matching of cutting motion and first vibration motion for obtaining specific structures. It can, however, also be desired to avoid the occurrence of specific structures, so that the parameters of cutting motion and vibration motion are set in view of this aspect. This can comprise the (quasi) accidental and also time-varying setting and/or the continuous varying of one or more parameters of the cutting motion and the vibration motion. In this connection, when setting the parameters (e.g. amplitude and/or frequency of the first vibration motion, rotational speed=rotational frequency of the tool, feed rate), specific ranges of values can be adhered to or avoided.

There can be provided control devices or feedback control devices which ensure that the predetermined motion parameters are adhered to. For one or a plurality of the respectively set motion parameters suitable sensors can be provided, so that the parameter can be feedback-controlled. However, precision-control systems can also be used which adjust the desired parameters with a definable accuracy.

With reference to FIG. 6 an embodiment is described in which the vibration motion is induced in such a way that distinctive surface zones are produced. In FIG. 6b a schematic section through a workpiece 6 and a tool 7 is shown. The tool 7 can be a tool with geometrically undefined cutting edge, e.g. an ultrasonic tool, by means of which complex geometries can be produced. 61 symbolizes the feed of the tool 7 relative to the workpiece 6 by a not shown mechanism. symbolizes a cutting motion designed as a rotational vibration about an axis perpendicular to the plane of projection. Instead of a rotational vibration 62, a conventional rotation about the cited axis can take place as well. 61 and 62 together represent the cutting motion.

A further vibration motion 63 can be temporarily superposed thereon, which can, e.g., be a translatory vibration perpendicular to the plane of projection. When the tool 7 is within the dotted areas 64*a* of the workpiece surface, the vibration motion 63 is activated in addition thereto, whereas it is deactivated when the tool is in the surface areas 64*b*. In this way different machining patterns are produced on the surface, which lead to distinctive surface zones. The differentiation can already be given with the naked eye, or it can result from the examination of the surface by means of apparatuses.

The activation of the vibration motion 63 in addition to the cutting motion 61, 62 and its deactivation can be effected in accordance with workpiece data. It can, however, also be effected in accordance with tool positions relative to previous or future tool positions or abstract spatial positions (defined spatial areas, defined by ranges of coordinates in a coordinate system).

The minimum dimensions of the individual areas 64 (in FIG. 6 the width of the stripes, otherwise, where applicable, the minimum diameter of individual/isolated areas ("islands")) can be a multiple of the wavelength of the image of the first vibration motion 63 on the workpiece surface, e.g. at least five times or at least ten times the wavelength.

Even if the embodiment of FIG. 6 was described with reference to a tool with geometrically undefined cutting edge, the same procedure (activating or deactivating or modulating a vibration motion 63) is possible also for a tool with a defined cutting edge (drill, turning tool, milling cutter, . . . ).

In a further embodiment a relative first vibration motion between tool and workpiece, which is superimposed on a cutting motion of a tool, can be induced in such a way that the produced surface is changed as compared to a surface processing without the first vibration motion. In this respect, the first vibration motion can have the effect that the surface quality is better when applying the same than it would be without this vibration motion. The roughness in the case of a superimposed vibration can be reduced as compared to the processing without superimposed vibration.

Generally, the removal rate of the tool can be relatively uninfluenced by the superimposed vibration motion 54, 63 (change <20% or <10% or <5%), so that the superimposed vibration motion 54, 63 primarily serves for structuring the surface and less for removing material.

The first vibration motion and the cutting motion can be generated by the same drive or by different drives. The same drive can be used in particular when the cutting motion, on its part, is a vibration motion. Then, a vibration drive can be actuated by superposed electric signals in accordance with the cutting motion and the vibration motion.

When different drives are used, they can both be provided at the side of the tool, or both at the side of the workpiece, or they can be spaced and act, on the one hand, on the tool, and on the other hand, on the workpiece, relatively to the machine frame, respectively.

The first vibration motion can have a motion component which is parallel to the local workpiece surface, and/or a motion component which is vertical to the local workpiece surface. The first vibration motion can be a translational or a rotatory vibration.

The cutting motion can comprise a second vibration motion and/or an advancing linear and/or rotatory motion of the tool relative to the workpiece. The cutting motion can be composed of a feed motion and a further motion, in particular a rotational motion. In the case of a drill, the feed motion advances along the drill axis, and the further motion is a rotation about the drill axis. In the case of processing by turning, the feed motion can be an advancing of the turning tool along an axis, whereas the further motion can be a rotation of the workpiece about an axis. In the case of a milling process the feed motion can be a relative translational displacement between tool and workpiece, whereas the further motion is a rotational motion of the milling tool about an axis.

Generally, the first vibration motion can change over time and, insofar, can be interpreted as a modulated vibration. The modulation can comprise the variation of the frequency, the amplitude (special case on/off switching), the waveform or the phasing of the first vibration motion. The modulation can be performed in accordance with workpiece data which have been obtained from a memory 13 or have been measured, or in accordance with only positional data of the tool relative to the workpiece or in accordance with specific measured or otherwise obtained process parameters, e.g. parameters of the cutting motion.

In accordance with the dimensioning specifications, the parameters of the individual motions (first vibration motion, cutting motion), on the one hand, and of the cutting edge geometry (in particular cutting edge length), on the other hand, can be selected and set. Remaining degrees of freedom can be used for optimizing the whole process.

The vibration frequencies of the first vibration motion can be above 100 Hz or above 1000 Hz or above 10,000 Hz. The amplitudes of the first vibration motion can be above 1 micrometer or above two micrometers or above 5 micrometers or above 10 micrometers and can be below one millimeter or below 500 micrometers or below 200 micrometers.

The control system 12 can control resp. feedback control the methods and method steps described in the second embodiment. A suitable sensor system can be provided for the signal feedback. Thus, the control system can also provide pre-set specifications for the adjustment of the mentioned motion parameters which, in turn, can be taken from the memory 13 by the control system.

Generally, tools can be used which are adapted to the application of the superimposed first vibration motion to the tool. FIG. 7 shows examples for this. Reference is made to the fact that such tools are regarded as an independent part of the invention.

Figure 7A:
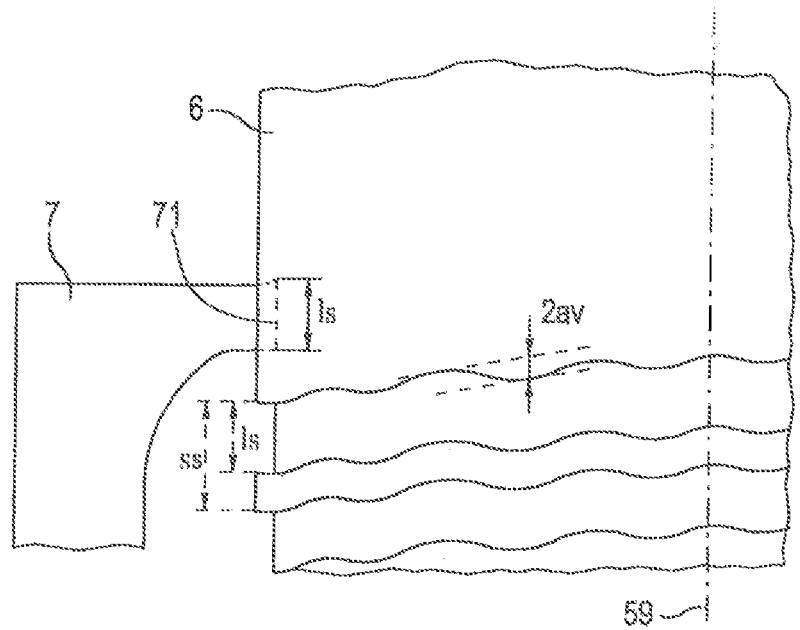
FIG. 7 shows adapted tools.

FIG. 7*a* shows an embodiment of a turning tool 7, in the case of which the cutting edge length ls of the cutting edge 71 is shorter than is the step width ss per rotation. The vibration amplitude av is relatively small and, in particular, smaller than the cutting edge length, but it is a noticeable proportion thereof, e.g. >2% or >5%, but <50% or <25% of the cutting edge length ls.

Figure 7B:
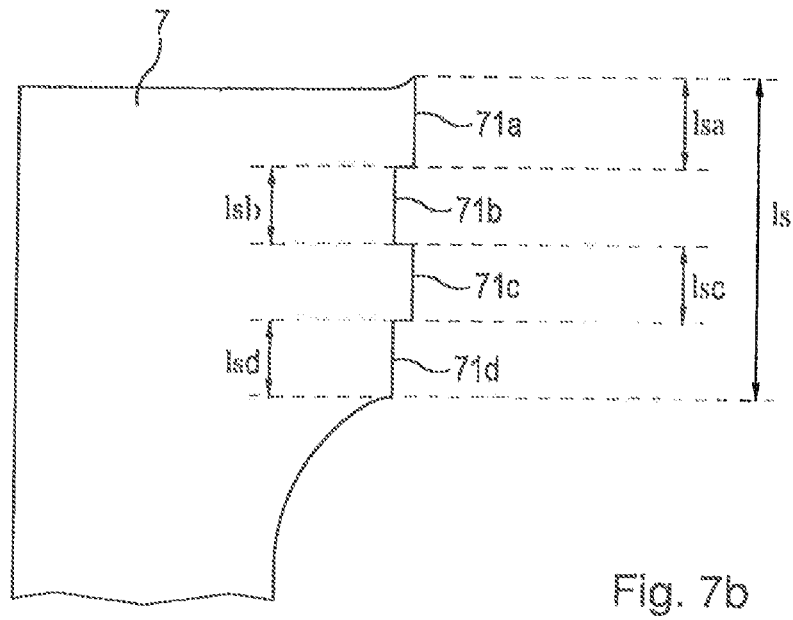

FIG. 7*b* shows a tool with geometrically defined cutting edge (in the shown example a turning tool), the cutting edge 71 of which is discontinuous or segmented. The cutting edge 71 is divided into segments 71*a*, 71*b*, 71*c* and 71*d* which, each by itself, can be sharpened cutting edges, but have, e.g., different distances to the rotational axis 59 of the workpiece. Here, an example is shown in which cutting edge portions have, alternatively, one or another of two possible distances to the rotational axis 59. The cutting edge lengths lsa, lsb, lsc, lsd of the individual cutting edge portions 71*a*, 71*b*, 71*c*, 71*d* can be equal to each other or different from each other. They can, each by itself, meet the dimensioning specifications of the above formula (3) in respect to the amplitude of the vibration motion or the step width. However, the total length is across all portions can also be inserted into the dimensioning specification.

An adapted drill can, at one or more of its lateral edges, have one or more cutting edge segments 71a possibly spaced apart along the edge. Cutting edge segments 71a at the one lateral edge can axially be located at a different position than cutting edge segments at another lateral edge.

A further subject-matter of the invention is a data carrier carrying a machine-readable code, which, when it is used in a suitable digitally program-controlled machine tool, causes the same to implement the described processes as a whole or the individual process steps. The code can be an executable code or a data code or a hybrid of both.

Features as to the prior art and as to the invention, which are illustrated in this description, are also to be combinable with each other when this is not expressly mentioned, as far as their combination is technically possible also across the different embodiments. Descriptions as to method steps are also to be understood as descriptions of devices implementing these steps, and descriptions as to particular devices and components are also to be understood as descriptions of method steps implemented by these devices and components.

The invention claimed is:

1. A method for machining a workpiece using a milling tool, wherein the milling tool engages with the workpiece and a cutting motion is induced between the milling tool and the workpiece, wherein
   a relative first vibration motion between the workpiece and the milling tool, which is superimposed on the cutting motion, is induced in such a way that one or more characteristic values of the first vibration motion and one or more characteristic values of the cutting motion are set related to one another, and
   wherein parameters are defined to satisfy one or more of the following equations:

$$fv=vs/lw$$

$$\phi=k5*\pi$$

wherein fv is a vibration frequency of the first vibration motion,
   vs is a feed rate of a cutting edge on a workpiece surface,
   lw is a wavelength of a pattern of the first vibration motion, which is formed on the workpiece surface,
   φ is a phase displacement in a feed direction of the cutting edge between several pairs of patterns in adjacent milled tracks, and
   k5 is a factor ranging from −1 to 1.

2. The method according to claim 1, wherein the characteristic values of the cutting motion and the characteristic values of the first vibration motion can be changed during the machining of the workpiece.

3. The method according to claim 1, wherein, in the case of a turning operation
   a frequency fv of the first vibration motion and a rotational frequency of the workpiece fs satisfy the formula fv=(n+k1)*fs, with n being an integer and k1 being a phase displacement between 0 and 1, and/or
   a vibration amplitude av and a feed rate vs of the turning tool satisfy the formula av=k2*vs/fs, with k2 being a selected real factor, and/or
   a cutting edge length ls satisfies the formula ls=k3*av, with k3 being a selected real factor.

4. A method, according to claim 1, wherein
   the relative first vibration motion between workpiece and tool, which is superimposed on the cutting motion, is induced in such a way that distinctive surface zones of the workpiece are generated.

5. The method according to claim 4, wherein, during the machining of the workpiece the first vibration motion is controlled in accordance with the position of the milling tool and, preferably, also in accordance with data describing the workpiece to be produced.

6. The method according to claim 4, wherein an amplitude and/or a direction of vibration and/or a frequency and/or a waveform of the first vibration motion are controlled in accordance with a position of the milling tool.

7. A method according to claim 1, wherein
   the relative first vibration motion between the workpiece and the milling tool, which is superimposed on the cutting motion, is induced in such a way that a surface produced is changed as compared to a machining without a first vibration motion.

8. The method according to claim 7, wherein the first vibration motion only slightly changes the removal of material, in particular by less than 20%, preferably by less than 10% or less than 5%, as compared to the removal by the cutting motion.

9. The method according to claim 1, wherein the cutting motion and the first vibration motion are induced by the same drive or by different drives.

10. The method according to claim 1, wherein the cutting motion and the first vibration motion are induced by different drives which both drive the milling tool or both drive the workpiece, or one drives the milling tool and one drives the workpiece.

11. The method according to claim 1, wherein the first vibration motion has a motion component being parallel to a local workpiece surface, and/or a motion component being vertical to the local workpiece surface.

12. The method according to claim 1, wherein the cutting motion comprises a second vibration motion and/or an advancing linear and/or rotatory motion of the workpiece relative to the milling tool.

13. The method according to claim 1, characterized by one or more of the following features:
   the first vibration motion comprises a translatory and/or a rotatory vibration,
   the first vibration motion extends in one spatial dimension or in two spatial dimensions or in all three spatial dimensions,
   the cutting motion comprises a second vibration motion which can comprise a translatory and/or a rotatory vibration, or it comprises an advancing rotation,
   the cutting motion comprises a feed motion advancing along a workpiece surface,
   a control of the first vibration motion comprises an on/off switching or an analogue modulation of one or more characteristic values of the first vibration motion,
   the control of the first vibration motion is performed in accordance with a momentary position of the milling tool at the workpiece and/or in accordance with a momentary relative position of the milling tool in relation to an earlier or a future position of the milling tool,
   the milling tool is a milling tool with a defined cutting edge or a milling tool with an undefined cutting edge.

14. A machine tool for the machining of a workpiece, comprising:
   a machine frame,
   a tool holding fixture fitted to the machine frame, a workpiece holding fixture fitted to the machine frame,
actuators for adjusting the relative position between the machine tool and the workpiece,
drives for generating a cutting motion between the machine tool and the workpiece, and
a control system for controlling and/or feedback controlling machine components,
wherein the control system is adapted for performing the method according to claim 1.

15. A tool for the use in the machine tool according to claim 14, the cutting edge of which is adapted to an amplitude of the first vibration motion, in particular in such a way that an area of the cutting edge has a structure, the dimensions of which are in the order of magnitude of the amplitude of the first vibration motion.

16. A method for machining a workpiece using a drill, wherein the drill engages with the workpiece and a cutting motion is induced between the workpiece and the drill, wherein a relative first vibration motion between the workpiece and the drill, which is superimposed on the cutting motion, is induced in such a way that one or more characteristic values of the first vibration motion and one or more characteristic values of the cutting motion are set related to one another, wherein parameters are defined to satisfy one more of the following equations:

$$fv=(n2+k6)*fs$$

$$av=k7*vv/fs$$

$$ls=k8*av15$$

wherein:
fv is a vibration frequency of the first vibration motion,
fs is a rotational frequency of the drill,
av is an amplitude of the first vibration motion which can be directed vertically to a rotational motion of the drill and vertically or in parallel to a workpiece surface,
vv is a feed rate of the drill along a drill axis,
ls is a length of cutting edge segments at a lateral edge of the drill defining an angle of twist,
n2 is an integer, and
k6 to k8 are real parameters with 0≤k6, k7, k8<1.

* * * * *